(12) United States Patent
Kim

(10) Patent No.: US 12,420,863 B2
(45) Date of Patent: Sep. 23, 2025

(54) APPARATUS FOR AND METHOD OF RESTRICTING ROTATION OF STEERING WHEEL IN STEER-BY-WIRE SYSTEM

(71) Applicant: HYUNDAI MOBIS CO., LTD., Seoul (KR)

(72) Inventor: Dong Hee Kim, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 174 days.

(21) Appl. No.: 18/350,283

(22) Filed: Jul. 11, 2023

(65) Prior Publication Data

US 2024/0149939 A1    May 9, 2024

(30) Foreign Application Priority Data

Nov. 7, 2022 (KR) .................. 10-2022-0146964

(51) Int. Cl.
*B62D 6/00* (2006.01)
*B62D 5/00* (2006.01)
*H02P 23/14* (2006.01)

(52) U.S. Cl.
CPC .............. *B62D 6/008* (2013.01); *B62D 5/006* (2013.01); *H02P 23/14* (2013.01)

(58) Field of Classification Search
CPC .......... B62D 6/008; B62D 5/006; B62D 5/04; B62D 5/001; B62D 5/046; B62D 5/0409; B62D 15/0215; H02P 23/14; H02P 29/40; B60Y 2400/61; B60Y 2400/83
USPC .................................................. 318/504, 494
See application file for complete search history.

(56) References Cited

U.S. PATENT DOCUMENTS

| | | | |
|---|---|---|---|
| 10,040,482 B1 * | 8/2018 | Jung .................... | G05D 1/0011 |
| 10,358,162 B2 * | 7/2019 | Kodera ................. | B62D 6/007 |
| 10,759,472 B2 * | 9/2020 | Kodera ................. | B62D 5/0478 |
| 2006/0200290 A1 * | 9/2006 | Chino ................... | B62D 6/008 |
| | | | 180/443 |

FOREIGN PATENT DOCUMENTS

KR    10-2022-0135496 A    10/2022

* cited by examiner

*Primary Examiner* — David Luo
(74) *Attorney, Agent, or Firm* — NovoTechIP International PLLC

(57) ABSTRACT

Proposed is an apparatus for restricting rotation of a steering wheel in a steer-by-wire system, the apparatus including a steering angle acquisition unit configured to acquire a steering angle; a driver configured to generate reaction force torque, responding to rotation of a steering wheel, through a motor by controlling an inverter of the motor; and a processor configured to restrict the rotation of the steering wheel through the motor by controlling the driver according to the steering angle, in a driver getting-in and getting-off mode.

14 Claims, 6 Drawing Sheets

APPARATUS FOR AND METHOD OF RESTRICTING ROTATION OF STEERING WHEEL IN STEER-BY-WIRE SYSTEM

CROSS-REFERENCE TO RELATED APPLICATIONS

This application claims priority from and the benefit of Korean Patent Application No. 10-2022-0146964, filed on Nov. 7, 2022, which is hereby incorporated by reference for all purposes as if set forth herein.

TECHNICAL FIELD

Exemplary embodiments of the present disclosure relate to an apparatus for and a method of restricting rotation of a steering wheel in a steer-by-wire system.

BACKGROUND

In a steer-by-wire (SbW) system that replaces a mechanical connection between vehicle wheels and a steering wheel, the steering wheel may be operated with an electrical signal generated due to rotation of the steering wheel.

The SbW system is configured in such a manner that, when a driver operates the steering wheel, an operating force of the steering wheel is transferred to a steering column and that a controller operates a steering gear box, thereby steering the vehicle wheels.

The SbW system, as described above, does not have U-joint components. For this reason, when an ignition switch is turned off, the steering wheel is easily rotated.

However, in most cases, the driver gets in and gets off the vehicle while holding on the steering wheel. For this reason, there is a need for a function of keeping the steering wheel stationary while the ignition switch is turned off.

The background art of the present disclosure is disclosed in Korean Patent Application Publication No. 10-2022-0135496 (published on Oct. 7, 2022 and entitled "Apparatus for Limited Steering Angle in Steer-by-Wire System").

SUMMARY

Various embodiments are directed to an apparatus for and a method of restricting rotation of a steering wheel in a steer-by-wire system, the apparatus and the method being capable of restricting rotation of a steering wheel when a driver gets in and gets off a vehicle in order for the driver to easily get in and get off the vehicle while holding up the steering wheel.

In an embodiment of the present disclosure, an apparatus for restricting rotation of a steering wheel in a steer-by-wire system includes: a steering angle acquisition unit configured to acquire a steering angle; a driver configured to generate reaction force torque, responding to rotation of a steering wheel, through a motor by controlling an inverter of the motor; and a processor configured to restrict the rotation of the steering wheel through the motor by controlling the driver according to the steering angle, in a driver getting-in and getting-off mode.

In an embodiment of the present disclosure, in the apparatus, the processor may operate at least in one of a motor control mode in which the steering wheel remains stationary by controlling the inverter in a pulse width modulation (PWM) manner through the driver, and an inverter control mode in which, with a counter electromotive force occurring to the motor by shorting a third phrase electric wire of the motor to the inverter of the motor, a reaction force is generated to the steering wheel.

In an embodiment of the present disclosure, in the apparatus, the processor may enter the driver getting-in and getting-off mode or may operate in the motor control mode according to a result of determining whether or not the steering angle by which the steering wheel is rotated is equal to or greater than a preset setting angle.

In an embodiment of the present disclosure, in the apparatus, the processor may operate in the inverter control mode according to a result of determining whether or not the operating time taken for the motor to operate to enable the steering wheel to remain stationary is equal to or greater than a preset setting time.

In an embodiment of the present disclosure, in the apparatus, the processor may operate in the inverter control mode according to a result of determining whether or not an amount of current that the motor consumes to enable the steering wheel to remain stationary is equal to or larger than a preset amount of current.

In an embodiment of the present disclosure, in the apparatus, the processor may collect learning data while operating in the motor control mode or the inverter control mode, may learn a driver getting-in and getting-off pattern using the learning data, and thus may control the motor control mode and the inverter control mode.

In an embodiment of the present disclosure, in the apparatus, the processor may control at least one of timing for entering and exiting the motor control mode, timing for entering and exiting the inverter control mode, and whether or not switching needs to take place between the motor control mode and the inverter control mode.

In an embodiment of the present disclosure, in the apparatus, the learning data may include at least one of an amount of change in the steering angle, points in time for entering and exiting the driver getting-in and getting-off mode, the time taken for the control of the motor control mode, the time taken for the control of the inverter control mode, a transition sequence and the number of times of transitions in the motor control mode, a transition sequence and the number of times of transitions in the inverter control mode, the time taken to reach a point in time when the steering angle changes after entering the driver getting-in and getting-off mode, and an amount of current consumed in the motor in the motor control mode.

In an embodiment of the present disclosure, a method of restricting rotation of a steering wheel in a steer-by-wire system includes: acquiring, by a steering angle acquisition unit, a steering angle in a driver getting-in and getting-off mode; and restricting, by a processor, rotation of a steering wheel through a motor by controlling a driver according to the steering angle.

In an embodiment of the present disclosure, in a method, in the restricting by the processor of the rotation of the steering wheel, the processor may operate at least in one of a motor control mode in which the steering wheel remains stationary by controlling the inverter in a pulse width modulation (PWM) manner through the driver, and an inverter control mode in which, with a counter electromotive force occurring to the motor by shorting a third phrase electric wire of the motor to the inverter of the motor, a reaction force is generated to the steering wheel.

In an embodiment of the present disclosure, in a method, in the restricting by the processor of the rotation of the steering wheel, the processor may enter the driver getting-in and getting-off mode or may operate in the motor control mode according to a result of determining whether or not the steering angle by which the steering wheel is rotated is equal to or greater than a preset setting angle.

In an embodiment of the present disclosure, in a method, in the restricting by the processor of the rotation of the steering wheel, the processor may operate in the inverter control mode according to a result of determining whether or not the operating time taken for the motor to operate to enable the steering wheel to remain stationary is equal to or greater than a preset setting time.

In an embodiment of the present disclosure, in a method, in the restricting by the processor of the rotation of the steering wheel, the processor may operate in the inverter control mode according to a result of determining whether or not an amount of current that the motor consumes to enable the steering wheel to remain stationary is equal to or larger than a preset amount of current.

In an embodiment of the present disclosure, in a method, in the restricting by the processor of the rotation of the steering wheel, the processor may collect learning data while operating in the motor control mode or the inverter control mode, may learn a driver getting-in and getting-off pattern using the learning data, and thus may control the motor control mode and the inverter control mode.

In an embodiment of the present disclosure, in a method, in the restricting by the processor of the rotation of the steering wheel, the processor may control at least one of timing for entering and exiting the motor control mode, timing for entering and exiting the inverter control mode, and whether or not switching needs to take place between the motor control mode and the inverter control mode.

In an embodiment of the present disclosure, in a method, the learning data may include at least one of an amount of change in the steering angle, points in time for entering and exiting the driver getting-in and getting-off mode, the time taken for the control of the motor control mode, the time taken for the control of the inverter control mode, a transition sequence and the number of times of transitions in the motor control mode, a transition sequence and the number of times of transitions in the inverter control mode, the time taken to reach a point in time when the steering angle changes after entering the driver getting-in and getting-off mode, and an amount of current consumed in the motor in the motor control mode.

According to an aspect of the present disclosure, the apparatus for and the method of restricting rotation of a steering wheel in a steer-by-wire system restrict the rotation of the steering wheel when the driver gets in and gets off a vehicle in order for the driver to get in and get off the vehicle conveniently and safely while holding up the steering wheel. Moreover, consumption of current by a battery system is minimized, and a motor and a cable are prevented from being burned and thus damaged.

According to another aspect of the present disclosure, the apparatus for and the method of restricting rotation of a steering wheel in a steer-by-wire system learn the driver getting-in and getting-off pattern, thereby improving the convenience of the driver who gets in and get off the vehicle.

DETAILED DESCRIPTION

Figure 1:
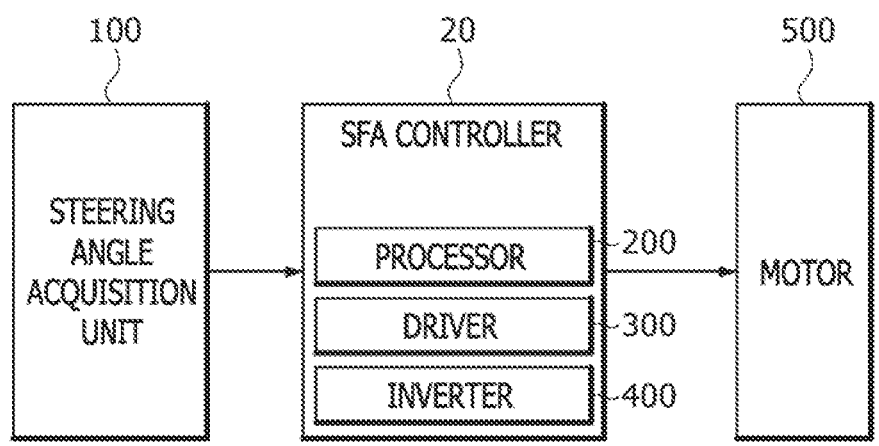
FIG. 1 is a block diagram illustrating a configuration of an apparatus for restricting rotation of a steering wheel in a steer-by-wire system according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

An apparatus for and a method of restricting rotation a steering wheel in an SbW system according to embodiments of the present disclosure will be described in detail below with reference to the accompanying drawings. For clarity and convenience in description, thicknesses of lines, sizes of constituent elements, and the like may be illustrated in non-exact proportion in the drawings. In addition, terms defined by considering the meanings thereof in the present disclosure will be used below and may vary according to the user's or manager's intention or according to practices in the art. Therefore, the terms should be contextually defined in light of the present specification.

Figure 2:
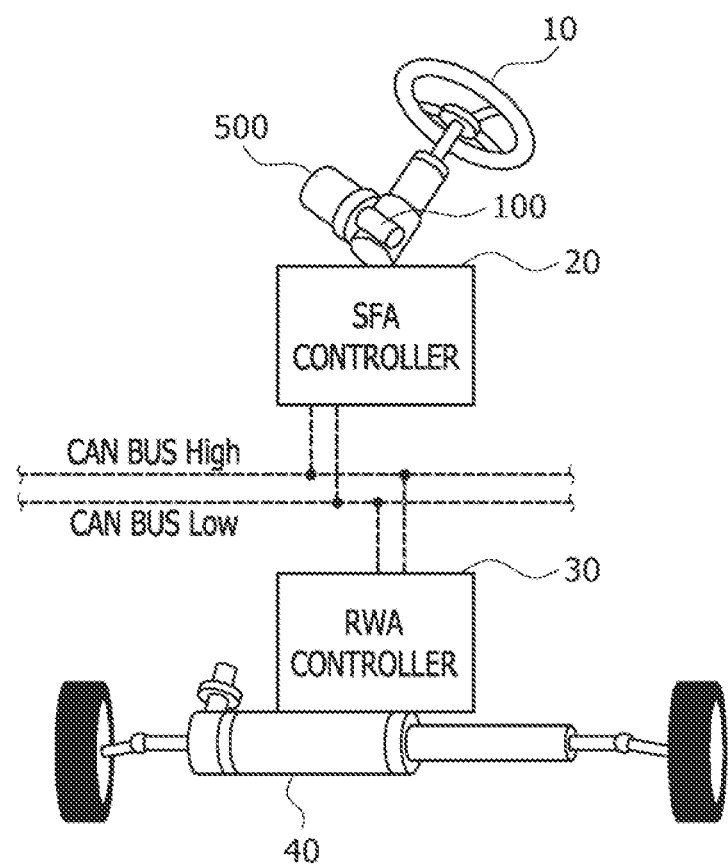
FIG. 2 is a block diagram illustrating a configuration of an SbW system in which the apparatus for restricting rotation of a steering wheel in a steer-by-wire system according to the embodiment may find application.
Figure 3:
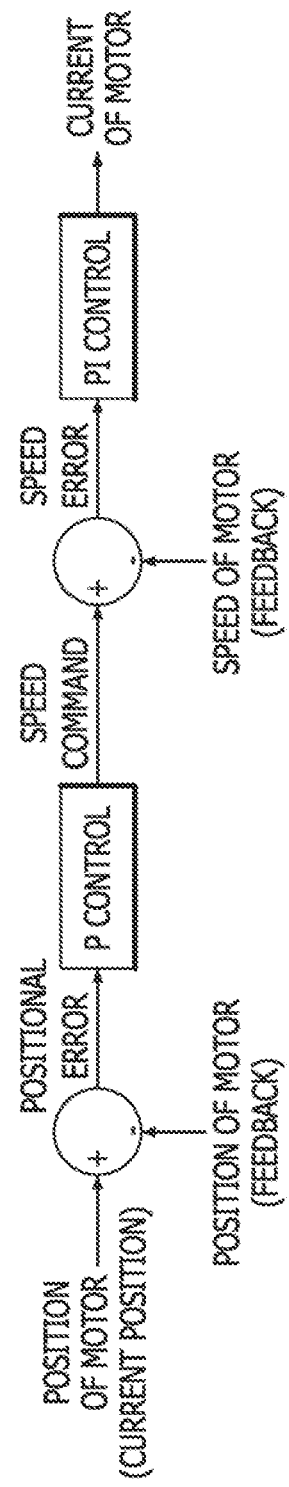
FIG. 3 is a flowchart illustrating operations in a motor control mode according to an embodiment of the present disclosure.
Figure 4:
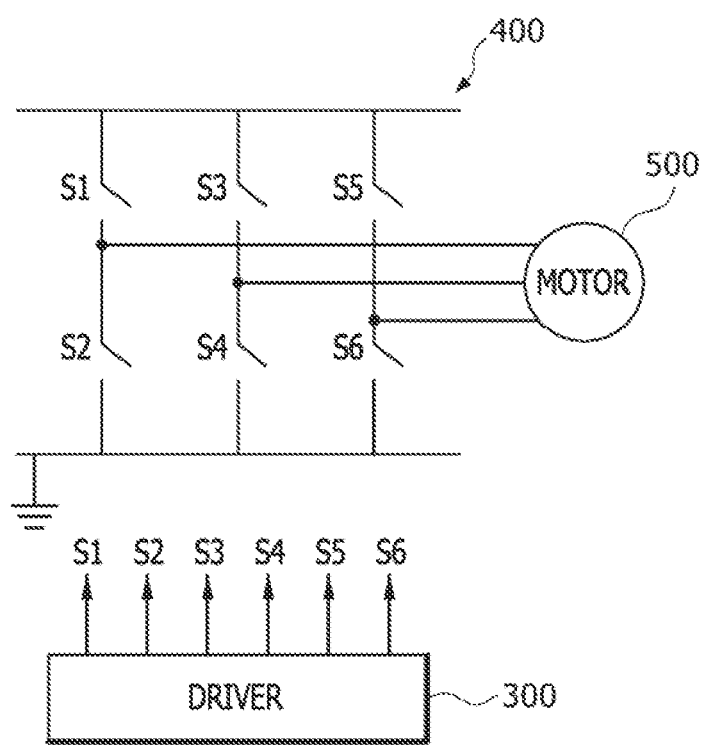
FIG. 4 is a flowchart illustrating operations in an inverter control mode according to an embodiment of the present disclosure.

FIG. 1 is a block diagram illustrating a configuration of the apparatus for restricting rotation of a steering wheel in a steer-by-wire system according to the embodiment of the present disclosure. FIG. 2 is a block diagram illustrating a configuration of an SbW system in which the apparatus for restricting rotation of a steering wheel in a steer-by-wire system according to the embodiment may find application. FIG. 3 is a flowchart illustrating operations in a motor control mode according to an embodiment of the present disclosure. FIG. 4 is a flowchart illustrating operations in an inverter control mode according to an embodiment of the present disclosure.

With reference to FIG. 1, the apparatus for restricting rotation of a steering wheel in a steer-by-wire system according to the embodiment of the present disclosure includes a steering angle acquisition unit 100, a processor 200, a driver 300, an inverter 400, and a motor 500.

The steering angle acquisition unit 100 acquires a steering angle of a steering wheel 10.

The steering angle acquisition unit 100 may be a steering angle sensor that acquires the steering angle or may be a motor steering-angle computation unit that computes the steering angle through an output signal of the motor 500.

That is, the steering angle may be acquired through the steering angle sensor or may be a motor steering angle that is generated on the basis of the output signal of the motor 500.

The motor 500 is installed on one side of a steering shaft and generates reaction force torque that corresponds to rotation of the steering wheel 10.

The motor 500 may be a steering force actuator (SFA) motor.

Usually, the SbW system replaces a mechanical connection between vehicle wheels and the steering wheel 10 and, the steering wheel 10 may be operated with an electrical signal generated due to the rotation of the steering wheel 10.

With reference to FIG. 2, the SbW system may include an SFA controller 20 and a road wheel actuator (RWA) controller 30.

The SFA controller 20 performs steering control of the steering wheel 10 on the basis of a rotational direction of the steering wheel 10 and an angle and torque of the steering wheel 10.

The RWA controller 30 controls wheels with the steering control by the SFA controller 20.

The SFA controller 20 and the RWA controller 30 are connected with use of a CAN bus or various hardware wires and may be activated according to a wake-up signal transferred from various outside controllers.

For example, in a case where a driver opens a door by operating a door handle before an ignition switch (not illustrated) of the vehicle is turned on, the SFA controller 20 and the RWA controller 30 may receive the wake-up signal from the outside controller when a smart key is detected or when a door open command is input from the smart key. In this case, the outside controller may be a smart key (SMK) controller of the SMK system that detects the smart key of the driver and performs an operation according to a position of the detected smart key or detects that the door of the vehicle is open.

Reference numeral 40 that is not referred to depicts an RWA motor.

The inverter 400 includes first to sixth switches S1 to S6 that regulate a flow of current for driving the motor 500.

Silicon (Si)-based transistors, such as insulated gate bipolar transistors (IGBTs), or silicon carbide (SiC)-based power semiconductors may be used as the first to sixth switches S1 to S6. However, the first to sixth switches S1 to S6 are not particularly limited to the above-mentioned transistors and power semiconductors.

The first switch S1 and the second switch S2 are connected in series to each other, the third switch S3 and the fourth switch S4 are connected in series to each other, and the fifth switch S5 and the sixth switch S6 are connected in series to each other.

A node between the first switch S1 and second switch S2 is connected to a first phase electric wire of the motor 500, a node between the third switch S3 and the fourth switch S4 is connected to a second phase electric wire of the motor 500, and a node between the fifth switch S5 and the sixth switch S6 is connected to a third phase electric wire of the motor 500.

Accordingly, the first to sixth switches S1 to S6 are switched on with a pulse width modulation (PWM) signal. Thus, alternating current is applied to the first to third phase electric wires of the motor 500, and the motor 500 is driven with the applied alternating current, thereby generating the reaction force torque.

The driver or driving unit 300 generates the reaction force torque responding to the rotation of the steering wheel 10, through the motor 500 by controlling the inverter 400 of the motor 500.

To that end, the driver 300 turns on or turns off the first switch S1 and the sixth switch S6 by applying the PWM signal to at least one of the first to sixth switches S1 to S6 according to a control signal of the processor 200.

In a driver getting-in and getting-off mode, the processor 200 restricts the rotation of the steering wheel 10 through the motor 500 by controlling the driver 300 according to the steering angle.

At this point, the processor 200 may be mounted in the SFA controller 20 of the SbW system, but is not particularly limited thereto.

The processor 200 may restrict the rotation of the steering wheel 10 in the motor control mode and the inverter control mode.

The motor control mode is a mode in which the steering wheel 10 remains stationary by controlling the inverter 400 in a PWM manner through the driver 300.

In the motor control mode, the processor 200, as illustrated in FIG. 3, controls a position of the motor 500 by performing P control (proportional control) on the basis of a positional error between a positional command of the motor 500 and a current position and controls a speed of the motor 500 by performing PI control (proportional integral control) on the basis of a speed error between a speed command and the speed of the motor 500.

In the motor control mode, because current is applied directly to the motor 500, the steering wheel 10 may reliably remain stationary without any movement. However, in the motor control mode, energy of a battery of an electric vehicle is consumed because the battery supplies current. Moreover, when a strong force is continuously applied to the steering wheel 10, the SbW system may maximally consume 120 A or more of current. In this case, the battery of the electric vehicle is discharged in a short time. Moreover, due to a high temperature of the motor 500 of the SbW system, the motor 500 may be demagnetized or may be burned and thus damaged, and a connector may melt.

In the inverter control mode, with a counter electromotive force that occurs to the motor 500 by shorting the third phase electric wire of the motor 500 to the inverter 400 of the motor 500, a reaction force is generated to the steering wheel 10.

In the inverter control mode, the processor 200, as illustrated in FIG. 4, pull-up switches (the first switch S1, the third switch S3, and the fifth switch S5) of the inverter 400 are turned off, and pull-down switches (the second switch S2, the fourth switch S4, and the sixth switch S6) are turned on. Accordingly, the third phase electric wire of the motor 500 is shorted, and thus the counter electromotive force may be applied to the motor 500.

In the inverter control mode, the reaction force is generated by applying the counter electromotive force to the motor 500, and thus current in the battery is less consumed. However, in the inverter control mode, the steering wheel 10 may be rotated according to a steering speed. Moreover, when a strong force is applied to the steering wheel 10, the steering wheel 10 is continuously rotated.

Accordingly, in a situation where the steering wheel 10 needs to remain completely stationary, the processor 200 operates in the motor control mode. Moreover, in a situation where current is continuously consumed, the processor 200 operates in the inverter control mode and thus actively restricts the rotation of the steering wheel 10.

That is, when entering the driver getting-in and getting-off mode, the processor 200 operates in the motor control mode in which the steering wheel 10 remains stationary by controlling the inverter 400 in a PWM manner through the driver 300.

In a case where the wake-up signal is input from the outside controller, the processor 200 enters a driver getting-in mode. In addition, when an ignition signal of the vehicle is turned off, the processor 200 enters a driver getting-off mode.

In a state where the processor 200 operates in the motor control mode, the processor 200 counts the operating time that is taken for the motor 500 to operate to enable the steering wheel 10 to remain stationary. In addition, the processor 200 checks an amount of current that the motor 500 consumes to enable the steering wheel 10 to remain stationary.

The processor 200 determines whether or not the operating time is equal to or longer than a preset setting time or whether or not the amount of current is equal to or larger than a preset amount of current.

The setting time is an operating time that is preset to limit consumption of current in a case where the processor 200 operates in the motor control mode.

The preset amount of current is an amount of current that is set in advance in order to limit the consumption of current in a case where the processor 200 operates in the motor control mode.

When the operating time is equal to or longer than the setting time, the processor 200 operates in the inverter control mode in which, with the counter electromotive force that occurs to the motor 500 by shorting the third phase electric wire of the motor 500 to the inverter 400 of the motor 500, the reaction force occurs to the steering wheel 10.

While operating in the inverter control mode, the processor 200 determines whether or not the steering angle by which the steering wheel 10 is rotated is equal to greater than a preset setting angle.

The setting angle is a rotation angle of the steering wheel 10 that is set in advance in order to limit the rotation of the steering wheel 10 in a case where the processor 200 operates in the inverter control mode.

When the steering angle is equal to or greater than the setting angle, the processor 200 enters the motor control mode.

In contrast, when the steering angle is smaller than the setting angle, the processor 200 determines whether or not the processor 200 need to exit the driver getting-in and getting-off mode.

When in a driver getting-in mode, the ignition of the vehicle is turned on or the door is closed, the processor 200 exits the driver getting-in mode. Moreover, when the door is closed in a driver getting-off mode, the processor 200 exits the driver getting-off mode.

When the processor 200 still operates in the driver getting-in and getting-off mode, the processor 200 operates in the inverter control mode.

When the processor exits the driver getting-in and getting-off mode, the processor 200 learns a driver getting-in and getting-off pattern using learning data.

The processor 200 stores the learning data while the above-described operations are performed.

The learning data may include an amount of change in the steering angle, points in time for entering and exiting the driver getting-in and getting-off mode, the time taken for control of the motor control mode, the time taken for control of the inverter control mode, a transition sequence and the number of times of transitions in the motor control mode, a transition sequence and the number of times of transitions in the inverter control mode, the time taken to reach a point in time when the steering angle changes after entering the driver getting-in and getting-off mode, and the amount of current consumed in the motor 500 in the motor control mode.

The processor 200 learns the driver getting-in and getting-off pattern using the stored learning data. According to a result of the learning, the processor 200 controls timing for entering and exiting the motor control mode, timing for entering and exiting the inverter control mode, and whether or not switching needs to take place between the motor control mode and the inverter control mode.

For example, according to the result of the learning, the processor 200 enters the driver getting-in and getting-off mode and then enters the motor control mode. Subsequently, the processor 200 may continuously maintain the motor control mode, or may exist the motor control mode and then enter the inverter control mode.

In addition, the processor 200 may continuously maintain the inverter control mode or may exit the inverter control mode and then enter the motor control mode.

The apparatus for restricting rotation of a steering wheel in a steer-by-wire system according to the embodiment of the present disclosure satisfies redundancy specifications. To that end, the processor 200, the driver 300, the inverter 400, and the motor 500 may operate in a redundant manner. The processor 200, the driver 300, the inverter 400, and the motor 500 may operate independently of each other or in conjunction with each other in order to limit the rotation of the steering wheel 10.

The method of restricting rotation of a steering wheel in a steer-by-wire system according to the embodiment of the present disclosure will be described in detail below with reference to FIGS. 5 and 6.

Figure 5:
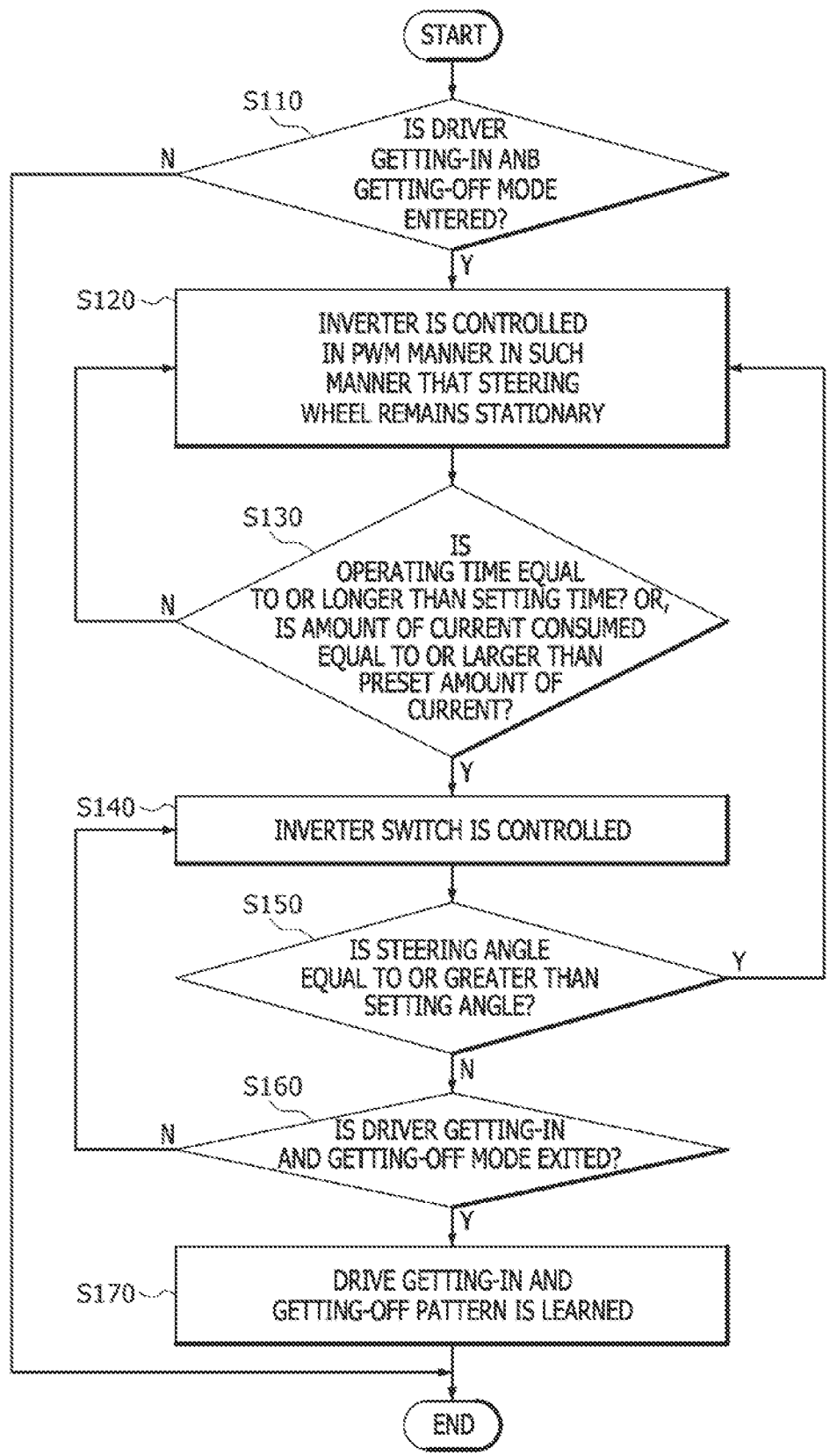
FIG. 5 is a flowchart illustrating an example of a method of restricting rotation of a steering wheel in a steer-by-wire system according to an embodiment of the present disclosure.

FIG. 5 is a flowchart illustrating an example of the method of restricting rotation of a steering wheel in a steer-by-wire system according to the embodiment of the present disclosure.

With reference to FIG. 5, first, the processor 200 determines whether or not the processor 200 need to enter the driver getting-in and getting-off mode (S110).

When as a result of the determination in Step S110, the processor 200 enters the driver getting-in and getting-off mode, the processor 200 operates in the motor control mode in which the steering wheel 10 remains stationary by controlling the inverter 400 in a PWM manner through the driver 300 (S120).

After entering the motor control mode, the processor 200 counts the operating time that is taken for the motor 500 to operate to enable the steering wheel 10 to remain stationary and determines whether or not the operating time is equal to or longer than the setting time. In addition, the processor 200 determines whether or not the amount of current that the motor 500 consumes to enable the steering wheel 10 to remain stationary is equal to or larger than the preset amount of current (S130).

When as a result of the determination in Step S130, the operating time is equal to or longer than the setting time, or the amount of current is equal to or larger than the preset amount of current, the processor 200 operates in the inverter control mode in which, with the counter electromotive force occurring to the motor 500 by shorting the third phase electric wire of the motor 500 to the inverter 400 of the motor 500, the reaction force is generated to the steering wheel 10 (S140).

After entering the inverter control mode, the processor 200 determines whether or not the steering angle by which the steering wheel 10 is rotated is equal to or greater than the setting angle (S150).

When as a result of the determination in Step S150, the steering angle is equal to or greater than the setting angle, the processor 200 returns to Step S120 and enters the motor control mode. Thereafter, the processor 200 performs the subsequent steps.

In contrast, when as a result of the determination in Step S150, the steering angle is smaller than the setting angle, the processor 200 determines whether or not the processor 200 needs to exit the driver getting-in and getting-off mode (S160).

When as a result of the determination in Step S160, the processor 200 does not need to exit the driver getting-in and getting-off mode, the processor 200 returns to Step S140 and continuously operates in the inverter control mode.

In contrast, when as a result of the determination in Step S160, the processor 200 exits the driver getting-in and getting-off mode, the processor 200 learns the getting-in and getting-off pattern using the driver learning data (S170).

The processor 200 stores learning the data while the above-described steps are performed. Accordingly, the processor 200 learns the driver getting-in and getting-off pattern using the stored learning data and, according to the result of the learning, restricts the rotation of the steering wheel 10. The restriction of the rotation of the steering wheel 10 is described with reference to FIG. 6.

Figure 6:
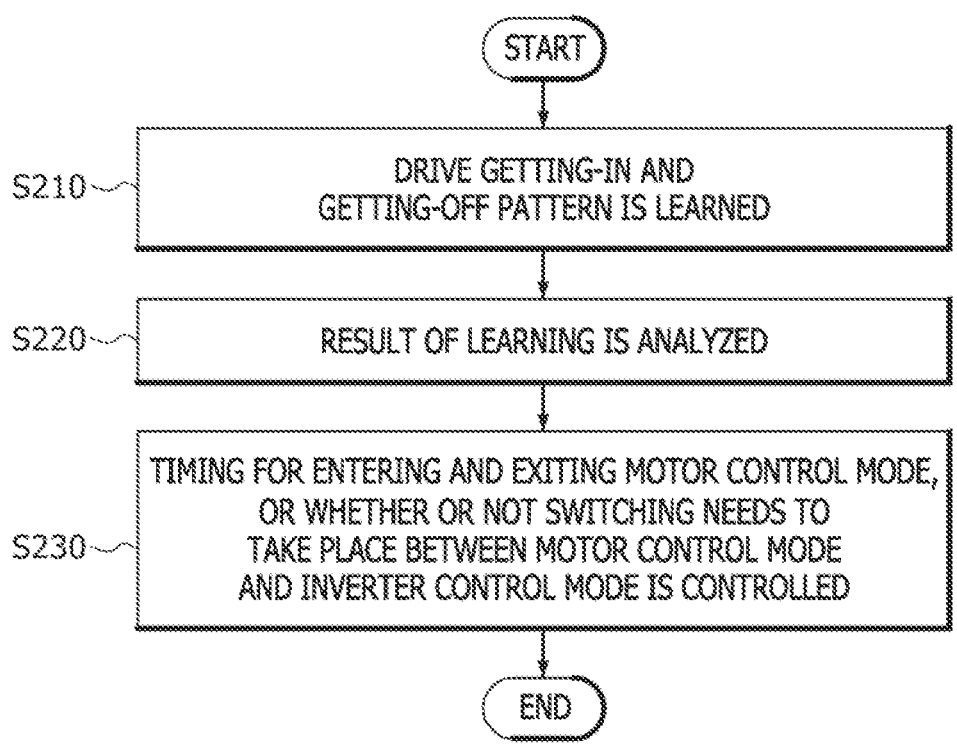
FIG. 6 is a flowchart illustrating another example of the method of restricting rotation of a steering wheel in a steer-by-wire system according to the embodiment of the present disclosure.

FIG. 6 is a flowchart illustrating another example of the method of restricting rotation of a steering wheel in a steer-by-wire system according to the embodiment of the present disclosure.

With reference to FIG. 6, the processor 200 learns the drive getting-in and getting-off pattern using the learning data (S210).

After learning the drive getting-in and getting-off pattern, according to a result of the learning, the processor 200 analyzes the result of the learning (S220) and controls the timing for entering and exiting the motor control mode, the timing for entering and exiting the inverter control mode, and whether or not switching needs to take place between the motor control mode and the inverter control mode (S230).

For example, according to the result of the learning, the processor 200 enters the driver getting-in and getting-off mode and then enters the motor control mode.

In a state where the processor 200 enters the motor control mode, according to the result of the learning, the processor 200 may continuously maintain the motor control mode, or may exit the motor control mode and then enter the inverter control mode.

In addition, in a state where the processor 200 enters the inverter control mode, according to the result of the learning, the processor 200 may continuously maintain the inverter control mode, or may exit the inverter control mode and then enter the motor control mode.

In this manner, the apparatus for and the method of restricting rotation of a steering wheel in a steer-by-wire system according to the embodiments of the present disclosure restrict the rotation of the steering wheel 10 when the driver gets in or get off the vehicle. Accordingly, the driver may get in or get off the vehicle conveniently and safely while holding on a steering wheel. Moreover, consumption of current by a battery system is minimized, and the motor and the cable is prevented from being burned and thus damaged.

In addition, the apparatus for and the method of restricting rotation of a steering wheel in a steer-by-wire system according to the embodiments of the present disclosure improve the convenience of the driver who gets in and gets off the vehicle by learning the driver getting-in and getting-off pattern.

A feature of the present disclosure described in the present specification may be realized in the form of, for example, a method, a process, an apparatus, a software program, a data stream, or a signal. The feature, although described in terms of realization in a single form (for example, described as only in the form of a method), may also be realized in a different form (for example, in the form of an apparatus or a program). The apparatus may be implemented in the form of adequate hardware, software, firmware, or the like. The method may be realized in, for example, a computer or a device, such as a microprocessor or a processor that usually refers to an integrated circuit or a processing device, such as a programmable logic device. Examples of the apparatus also include a computer and a communication device, such as a cellular phone or a portable/personal information terminal (a personal digital assistant ("PDA"), that facilitate communication of information between end users.

The embodiments of the present disclosure are described only in an exemplary manner with reference to the drawings. From the description of the embodiments, it would be understandable by a person of ordinary skill in the art to which the present disclosure pertains that various modifications are possibly made to the embodiments and that an embodiment equivalent thereto is possibly practiced. Therefore, the proper technical scope of the present disclosure should be defined by the following claims.

What is claimed is:

1. An apparatus for restricting rotation of a steering wheel in a steer-by-wire system, the apparatus comprising:
    a steering angle acquisition unit configured to acquire a steering angle;
    a driving unit configured to control an inverter of a motor to generate a reaction force torque in response to a rotation of a steering wheel; and
    a processor configured to instruct the driving unit based on the steering angle such that the driving unit causes the inverter to generate the reaction force torque to restrict the rotation of the steering wheel in a driver getting-in and getting-off mode,
    wherein the processor operates at least in one of a motor control mode and an inverter control mode,
    wherein, in the motor control mode, the processor causes the driving unit to use pulse-width modulation (PWM) control to cause the inverter to generate the reaction force torque so that the steering wheel remains stationary, and
    wherein, in the inverter control mode, the processor causes a third phrase electric wire of the motor to be shorted to the inverter of the motor such that a counter electromotive force is produced in the motor that generates the reaction force torque so that the steering wheel remains stationary.

2. The apparatus of claim 1, wherein the processor enters the driver getting-in and getting-off mode or operates in the motor control mode depending on whether the steering angle is equal to or greater than a preset setting angle.

3. The apparatus of claim 1, wherein the processor operates in the inverter control mode when an operating time for the motor to maintain the steering wheel stationary is equal to or greater than a preset setting time.

4. The apparatus of claim 1, wherein the processor operates in the inverter control mode when an amount of current that the motor consumes to maintain the steering wheel stationary is equal to or greater than a preset amount of current.

5. The apparatus of claim 1, wherein the processor collects learning data while operating in the motor control mode and the inverter control mode and learns a driver getting-in and getting-off pattern from the learning data, the driver getting-in and getting-off pattern being used as a basis for controlling the motor control mode and the inverter control mode.

6. The apparatus of claim 5, wherein the processor controls at least one of a timing for entering and exiting the motor control mode and a timing for entering and exiting the inverter control mode, and a timing for when switching needs to take place between the motor control mode and the inverter control mode.

7. The apparatus of claim 5, wherein the learning data includes at least one of:
    an amount of change in the steering angle;
    points in time for entering and exiting the driver getting-in and getting-off mode;
    a time spent in the motor control mode;
    a time spent in the inverter control mode;
    a sequence and number of transitions in the motor control mode,
    a sequence and number of transitions in the inverter control mode;
    a time taken for the steering angle to change after entering the driver getting-in and getting-off mode; and
    an amount of current consumed by the motor in the motor control mode.

8. A method of restricting rotation of a steering wheel in a steer-by-wire system, the method comprising:
    acquiring, using a steering angle acquisition unit, a steering angle while the steer-by-wire system is operated in a driver getting-in and getting-off mode; and
    controlling a driving unit of a motor to generate a reaction force torque to restrict rotation of the steering wheel based on the steering angle,
    wherein a processor controls the driving unit, the processor being configured to operate in at least in one of a motor control mode and an inverter control mode,
    wherein, in the motor control mode, the processor causes the driving unit to use pulse width modulation (PWM) to drive an inverter of the motor to generate the reaction force torque, and
    wherein, in the inverter control mode, the processor shorts a third phrase electric wire of the motor to the inverter to produce an electromotive counterforce in the motor which generates the reaction force torque.

9. The method of claim 8, wherein the processor enters the driver getting-in and getting-off mode or operates in the motor control mode based on whether the steering angle is equal to or greater than a preset setting angle.

10. The method of claim 8, wherein the processor operates in the inverter control mode based on whether an operating time spent for the motor to maintain the steering wheel stationary is equal to or greater than a preset setting time.

11. The method of claim 8, wherein the processor operates in the inverter control mode based on whether an amount of current the motor consumes to maintain the steering wheel stationary is equal to or greater than a preset amount of current.

12. The method of claim 8, wherein the processor collects learning data while operating in the motor control mode and the inverter control mode and learns a driver getting-in and getting-off pattern based on the learning data, the driver getting-in and getting-off pattern being used as a basis for controlling the motor control mode and the inverter control mode.

13. The method of claim 12, wherein the processor controls at least one of a timing for entering and exiting the motor control mode, a timing for entering and exiting the inverter control mode, and a timing for when switching needs to take place between the motor control mode and the inverter control mode.

14. The method of claim 12, wherein the learning data includes at least one of:
    an amount of change in the steering angle;
    points in time for entering and exiting the driver getting-in and getting-off mode;
    a time spent in the control of the motor control mode;
    a time spent in the inverter control mode;
    a sequence and number of transitions in the motor control mode;

a sequence and number of transitions in the inverter control mode;
a time for the steering angle to change after entering the driver getting-in and getting-off mode; and
an amount of current consumed in the motor in the motor control mode.

* * * * *